United States Patent
Yasutake (10) Patent No.: US 7,369,963 B2
(45) Date of Patent: May 6, 2008

(54) SYSTEM MANAGING APPARATUS, INFORMATION PROCESSING APPARATUS, AND METHOD OF IMPLEMENTING REDUNDANT SYSTEM-MANAGING APPARATUS

(75) Inventor: Toshio Yasutake, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/169,804

(22) Filed: Jun. 30, 2005

(65) Prior Publication Data

US 2006/0212267 A1  Sep. 21, 2006

(30) Foreign Application Priority Data

Mar. 16, 2005  (JP) .............................. 2005-075725

(51) Int. Cl.
*G06F 15/00* (2006.01)
(52) U.S. Cl. ..................................................... 702/183
(58) Field of Classification Search ................. 702/183
See application file for complete search history.

(56) References Cited

U.S. PATENT DOCUMENTS 4,347,563 A * 8/1982 Paredes et al. ............... 700/8

6,779,128 B1 * 8/2004 Gale et al. ...................... 714/6
6,952,659 B2 * 10/2005 King et al. .................. 702/186

FOREIGN PATENT DOCUMENTS

| JP | 8-163165 | 6/1996 |
| JP | 2001-204172 | 7/2001 |
| JP | 2003-346858 | 12/2003 |

* cited by examiner

*Primary Examiner*—John Barlow
*Assistant Examiner*—Lisa Sievers
(74) *Attorney, Agent, or Firm*—Staas & Halsey LLP (57) ABSTRACT

A system managing apparatus that monitors a status of a device, which is installed in an information processing apparatus, includes a connecting unit that connects the system managing apparatus with other system managing apparatus installed in other information processing apparatus to exchange information; and a monitoring-target switching unit that switches a device to be monitored from a device connected to the system managing apparatus to other device connected to the other system managing apparatus.

5 Claims, 6 Drawing Sheets

SYSTEM MANAGING APPARATUS, INFORMATION PROCESSING APPARATUS, AND METHOD OF IMPLEMENTING REDUNDANT SYSTEM-MANAGING APPARATUS

CROSS-REFERENCE TO RELATED APPLICATION

This application claims priority under 35 U.S.C. § 119 (a) et seq. of Japanese Patent Application No. 2005-75725 filed on Mar. 16, 2005, a certified copy of which was submitted on Jun. 30, 2005.

BACKGROUND OF THE INVENTION

1. Field of the Invention

The present invention relates to a system managing apparatus, an information processing apparatus, and a method of implementing redundant system-managing-apparatus, and, more particularly to a system managing apparatus, an information processing apparatus, and a method of implementing redundant system-managing-apparatus that can realize a redundant configuration of the system managing apparatus at low cost with a simple mechanism.

2. Description of the Related Art

Conventionally, an information processing apparatus that requires high reliability such as a server device that operates for 24 hours a day takes, in many cases, a redundant configuration having double or multiplexed internal devices. With the redundant configuration, even when a fault occurs in a certain device during the operation, the same type of another device can take over the function and continue the operation.

Japanese Patent Application Laid-Open No. 2001-204172 discloses a technique of improving reliability of an information processing apparatus by providing redundant internal devices. According to Japanese Patent Application Laid-Open No. 2001-204172, the information processing apparatus includes plural power supply devices. When a fault occurs in a power supply device in an operating status, another power supply device is changed to an operating status.

Recently, an information processing apparatus called a blade server that can store plural system blades (SB) within a casing is becoming popular. Each system blade can have a central processing unit (CPU) or a memory mounted thereon, and can be supplied with power from the casing to execute an independent processing. Provision of a blade server has high expandability as compared with provision of plural server devices, and installation space thereof is small.

According to the blade server system, a system managing apparatus called a management blade (MMB) that monitors devices such as the system blade and controls power supply is generally installed within the casing. Since the system managing apparatus plays a very important role of monitoring a status of the system blade and the like, many of relatively expensive blade servers have a redundant configuration having plural system managing apparatuses.

However, many of relatively low-price blade servers include only one system managing apparatus for cost reasons. With the configuration having no redundant system managing apparatus, when a fault occurs in this only one system managing apparatus, it is not only impossible to monitor the status of devices within the casing, but may lead to a serious trouble due to the fault in the device.

SUMMARY OF THE INVENTION

It is an object of the present invention to at least solve the problems in the conventional technology.

A system managing apparatus according to one aspect of the present invention, which is installed in an information processing apparatus for monitoring a status of a device, includes a connecting unit that connects the system managing apparatus with other system managing apparatus installed in other information processing apparatus to exchange information; and a monitoring-target switching unit that switches a device to be monitored from a device connected to the system managing apparatus to other device connected to the other system managing apparatus.

An information processing apparatus according to another aspect of the present invention includes a system managing apparatus for monitoring a status of a device. The system managing apparatus includes a connecting unit that connects the system managing apparatus with other system managing apparatus installed in other information processing apparatus to exchange information; and a monitoring-target switching unit that switches a device to be monitored from a device connected to the system managing apparatus to other device connected to the other system managing apparatus.

A method according to still another aspect of the present invention, which is for implementing a redundant system-managing-apparatus for monitoring a status of a device, includes connecting a first system managing apparatus of a first information processing apparatus with a second system managing apparatus of a second information processing apparatus for an exchange of information; determining including the first system managing apparatus determining whether the second system managing apparatus is in an active status, and the second system managing apparatus determining whether the first system managing apparatus is in an active status; and switching, when it is determined that one of the first system managing apparatus and the second system managing apparatus is in a halt status, including other of the first system managing apparatus and the second system managing apparatus switching a device to be monitored, and monitoring a status of a device connected to the one of the first system managing apparatus and the second system managing apparatus in the halt status, via a connection established at the connecting.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of a system managing apparatus, an information processing apparatus, and a method of implementing redundant system-managing-apparatus according to the present invention will be explained in detail below with reference to the accompanying drawings. Note that the present invention is not limited by the embodiments.

Figure 1:
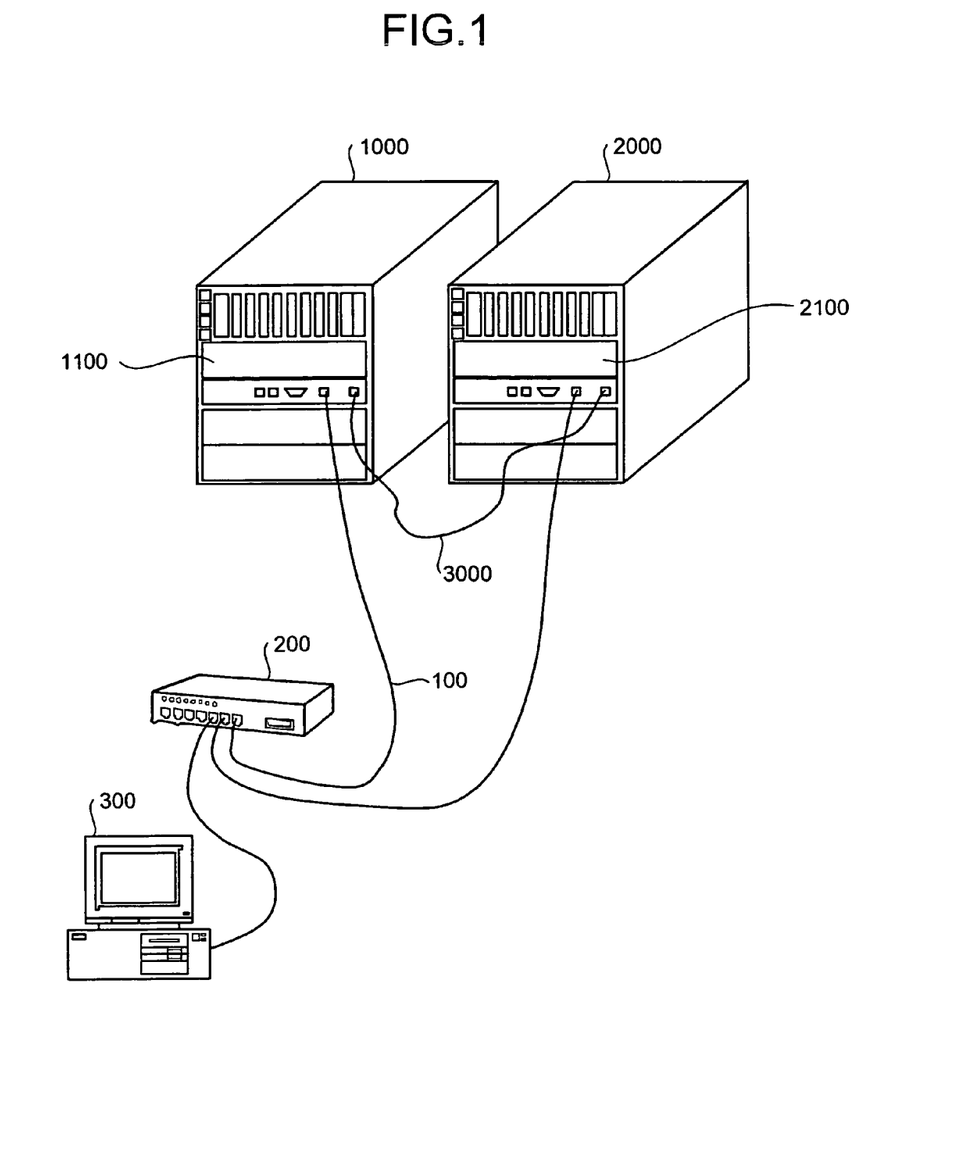
FIG. 1 is an explanatory diagram of the principle of a method of implementing redundant system-managing-apparatus according to an embodiment of the present invention.

FIG. 1 is an explanatory diagram of the principle of a method of implementing redundant system-managing-apparatus according to an embodiment of the present invention. As shown in FIG. 1, a system managing apparatus 1100 mounted on an information processing apparatus 1000 and a system managing apparatus 2100 mounted on an information processing apparatus 2000 are connected to each other via a cable 3000.

The system managing apparatuses of plural information processing apparatuses are interconnected to each other, and even when a fault occurs in one system managing apparatus, a system managing apparatus of one of the other information processing apparatuses takes over the processing. Based on this configuration, when each information processing apparatus has only one system managing apparatus, the function of the system managing apparatus can be made redundant.

The system managing apparatus 1100 and the system managing apparatus 2100 are also connected to each other by a local area network (LAN) cable 100 via a switching hub 200. When system managing apparatuses of plural information processing apparatuses are connected to each other by a network such as a LAN, thereby periodically carrying out network communications between the system managing apparatuses, it is possible to confirm by a simple mechanism whether other system managing apparatuses are in a halt status.

Whether the system managing apparatuses that are interconnected to each other are operating normally can be also confirmed via the cable 3000. However, depending on the contents of a fault, correct information cannot be obtained according to this method. Therefore, the provision of a mechanism of obtaining a status of the system managing apparatuses that are interconnected to each other by a separate method like the above is useful to improve the reliability of the system as a whole.

The system managing apparatus 1100 and the system managing apparatus 2100 are also connected to a managing terminal 300 by the LAN cable 100. When a fault occurs in one of the interconnected system managing apparatuses, a system managing apparatus that detects the fault notifies fault information to the managing terminal 300 based on a simple network management protocol (SNMP) or the like, thereby urging a system manager to replace the system managing apparatus with the fault.

While system managing apparatuses of two information processing apparatuses are interconnected to each other in FIG. 1, system managing apparatuses of three or more information processing apparatuses can be also interconnected to each other. For the sake of convenience, in the present embodiment, the system managing apparatuses of the two information processing apparatuses 1000 and 2000 are interconnected to each other, as shown in FIG. 1.

A configuration of the information processing apparatus having the system managing apparatus according to the present embodiment is explained next. Since the information processing apparatus 1000 and the information processing apparatus 2000 shown in FIG. 1 have the same configurations, the information processing apparatus 1000 will be taken as an example for explanation.

Figure 2:
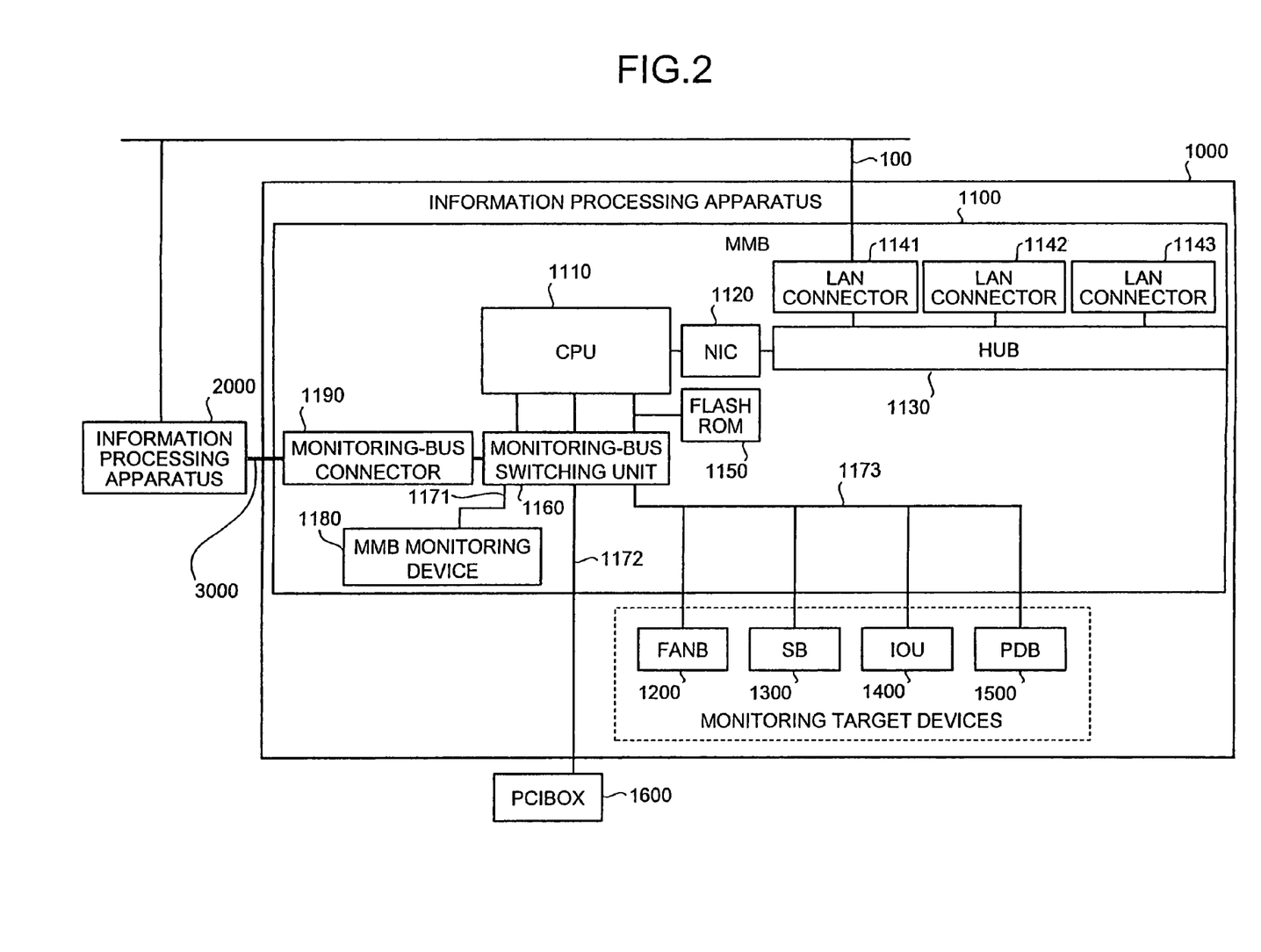
FIG. 2 is a block diagram of a configuration of an information processing apparatus having a system managing apparatus according to the present embodiment.

FIG. 2 is a block diagram of the configuration of the information processing apparatus having the system managing apparatus according to the present embodiment. As shown in FIG. 2, the information processing apparatus 1000 has a system managing apparatus (i.e., management blade; MMB) 1100, a fan control blade (FANB) 1200, a system blade (SB) 1300, an input/output unit (IOU) 1400, a power distribution blade (PDB) 1500, and the like. The information processing apparatus 1000 is also externally connected to a peripheral component interconnect (PCI) box 1600. The information processing apparatus 1000 can have several devices other than the system managing apparatus 1100. The information processing apparatus 1000 can also have devices other than those shown in FIG. 2.

The system managing apparatus 1100 monitors various kinds of externally connected devices installed inside the information processing apparatus 1000, executes a schedule management such as turning on or off of a power supply at a time registered in advance, and controls the power supply. The system managing apparatus 1100 has a CPU 1110, a network interface controller (NIC) 1120, a hub 1130, LAN connectors 1141 to 1143, a flash read-only memory (ROM) 1150, a monitoring bus switching unit 1160, an MMB monitoring bus 1171, a PCI box monitoring bus 1172, a device monitoring bus 1173, an MMB monitoring device 1180, and a monitoring bus connector 1190.

The CPU 1110 controls the whole of the system managing apparatus 1100, and achieves various functions by executing firmware stored in the flash ROM 1150. The NIC 1120 controls network communications carried out by the CPU 1110, and is connected to the LAN connectors 1141 to 1143 via the hub 1130. The NIC 1120 can communicate via plural networks at the same time.

One of the LAN connectors is connected to the system managing apparatus 2100 of the information processing apparatus 2000 via the LAN cable 100. The CPU 1110 periodically communicates with the system managing apparatus 2100 using this network connection, and confirms a status of the system managing apparatus 2100. For example, the CPU 1110 periodically transmits a packet Internet groper (PING) as a standard connection confirmation message in the transmission control protocol/Internet protocol (TCP/IP) to the system managing apparatus 2100, and confirms a response, thereby confirming whether the system managing apparatus 2100 is in a halt status.

The flash ROM 1150 stores firmware executed by the CPU 1110 and various kinds of set information used by the firmware. The various kinds of set information include information concerning the network communication carried out to confirm a status of the other system managing apparatuses, information of the managing terminal that notifies fault information, and schedule information used in the schedule management function.

The monitoring bus switching unit 1160 switches a device of which status is monitored by the CPU 1110. The monitoring bus switching unit 1160 is connected to the MMB monitoring device 1180 via the MMB monitoring bus 1171. The MMB monitoring device 1180 monitors a status of the system managing apparatus itself. The MMB monitoring device 1180 is also connected to the PCI box 1600 via the PCI box monitoring bus 1172, and is connected to an internal device such as the system blade 1300 via the device monitoring bus 1173. The MMB monitoring device 1180 is then connected to the system managing apparatus 2100 of the information processing apparatus 2000 by the cable 3000 via the monitoring bus connector 1190.

In the initial status, the monitoring bus switching unit 1160 is set such that the CPU 1110 monitors a device belonging to the information processing apparatus 1000. Specifically, the CPU 1110 and the MMB monitoring device 1180 are connected to each other via the MMB monitoring bus 1171. The CPU 1110 and the PCI box 1600 are connected to each other via the PCI box monitoring bus 1172. The CPU 1110 and the system blade 1300 are connected to each other via the device monitoring bus 1173.

When it is found that a fault occurs in the system managing apparatus 2100 of the information processing apparatus 2000, the CPU 1110 sequentially switches the setting of the monitoring bus switching unit 1160, and monitors a device belonging to the information processing apparatus 1000 and a device belonging to the information processing apparatus 2000. Upon receiving a monitoring bus selecting signal from the CPU 1110, the monitoring bus switching unit 1160 switches a device to be monitored by the CPU 1110, to the device belonging to the information processing apparatus 1000 or the device belonging to the information processing apparatus 2000.

In monitoring the device belonging to the information processing apparatus 2000, the CPU 1110 is connected to the system managing apparatus 2100 via the cable 3000. In this case, the monitoring bus switching unit within the system managing apparatus 2100 receives the monitoring bus selecting signal from the CPU 1110, thereby switching a bus connection destination to monitor the device, from the CPU within the system managing apparatus 2100 to the cable 3000. In this way, the monitoring bus switching unit of the system managing apparatus 1100 and that of the system managing apparatus 2100 operate in cooperation with each other to achieve redundancy of the function of the system managing apparatus.

With this mechanism, the function of the system managing apparatus other than the device monitoring function is also multiplexed. For example, since the CPU 1110 is also connected to the fan control blade and the PDB of another information processing apparatus via the cable 3000, the CPU 1110 can also take over the function of controlling a power supply or the function of controlling a fan.

In the method according to the present embodiment, there is no means for reading the contents of the flash ROM 1150 from another system managing apparatus. Therefore, it is not possible to make redundant a function that depends on the content of the flash ROM 1150. For example, the schedule management function as one of the functions of the system managing apparatus cannot be made redundant, because this function depends on the schedule information stored in the flash ROM 1150.

The method according to the present embodiment has an object of achieving a low-cost redundant configuration with a simple mechanism. Therefore, this method does not have means for reading the content of the flash ROM 1150 from another system managing apparatus. This means can be provided at cost.

The FANB 1200 controls the fan of the information processing apparatus 1000. The SB 1300 has a CPU and a memory mounted thereon, and executes an operating system (OS) and the application. The IOU 1400 connects between various kinds of input and output devices. The PDB 1500 supplies power to the information processing apparatus 1000 and various kinds of devices belonging to the information processing apparatus 1000. The PCI box 1600 is an external device to expand various kinds of input and output devices.

Figure 3:
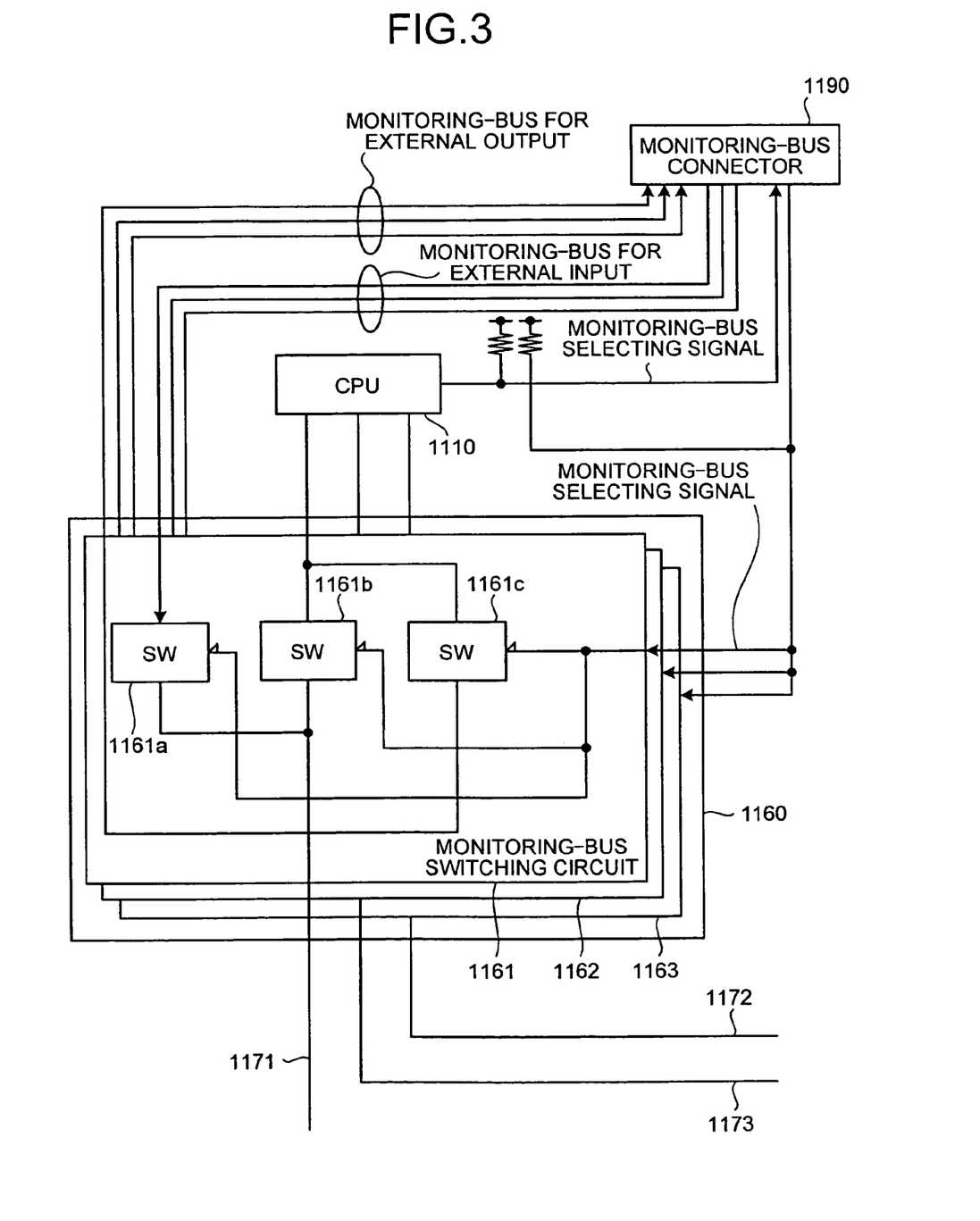
FIG. 3 is a block diagram of a configuration of a monitoring bus switching unit.

FIG. 3 is a block diagram of the configuration of the monitoring bus switching unit 1160. While only details of a monitoring bus switching circuit 1161 that switches the MMB monitoring bus 1171 are shown in FIG. 3, a monitoring bus switching circuit 1162 that switches the PCI box monitoring bus 1172 and a monitoring bus switching circuit 1163 that switches the device monitoring bus 1173 also have similar configurations.

The monitoring bus switching circuit 1161 of the monitoring bus switching unit 1160 has switches 1161*a* to 1161*c* that switch a device to be monitored by the CPU 1110. These switches are changed over by receiving a monitoring bus selecting signal from the CPU 1110. The monitoring bus selecting signal is also transmitted to the monitoring bus switching unit of another system managing apparatus via the cable 3000 connected to the monitoring bus connector 1190, thereby changing a status of the monitoring bus switching unit.

Figure 4:
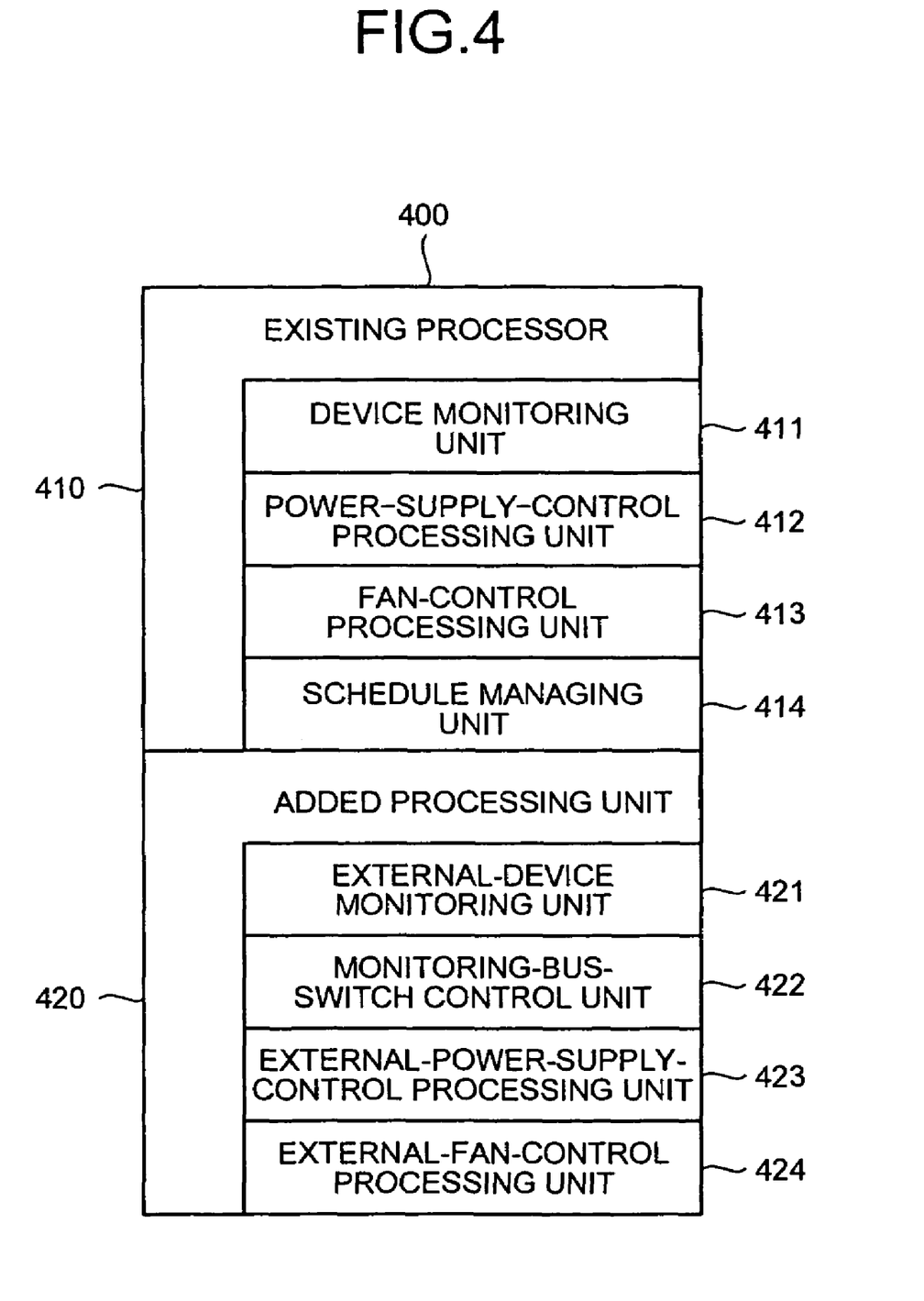
FIG. 4 is a block diagram of a configuration of firmware executed by a CPU.

FIG. 4 is a block diagram of the configuration of firmware 400 executed by the CPU 1110. As shown in FIG. 4, the firmware 400 includes an existing processor 410 and an added processor 420.

The existing processor 410 is also equipped in conventional firmware, and has a device monitoring unit 411, a power supply control processor 412, a fan control processor 413, a schedule managing unit 414, and the like. The device monitoring unit 411 monitors a status of a device belonging to the information processing apparatus. The power supply control processor 412 and the fan control processor 413 control the power supply and the fan respectively of the information processing apparatus. The schedule managing unit 414 executes the processing of turning on or off of the power supply to the system blade based on a schedule registered in advance.

The added processor 420 is unique in the system managing apparatus according to the present embodiment, and has an external device monitoring unit 421, a monitoring bus switch controller 422, an external power supply control processor 423, an external fan control processor 424, and the like. The external bus monitoring unit 421 monitors a status of a device belonging to another information processing apparatus. The monitoring bus switch controller 422 transmits a monitoring bus selecting signal, and changes a connection status of the monitoring bus switching unit 1160. The external power supply control processor 423 and the external fan control processor 424 control the power supply and the fan respectively of the external information processing apparatus.

Figure 5:
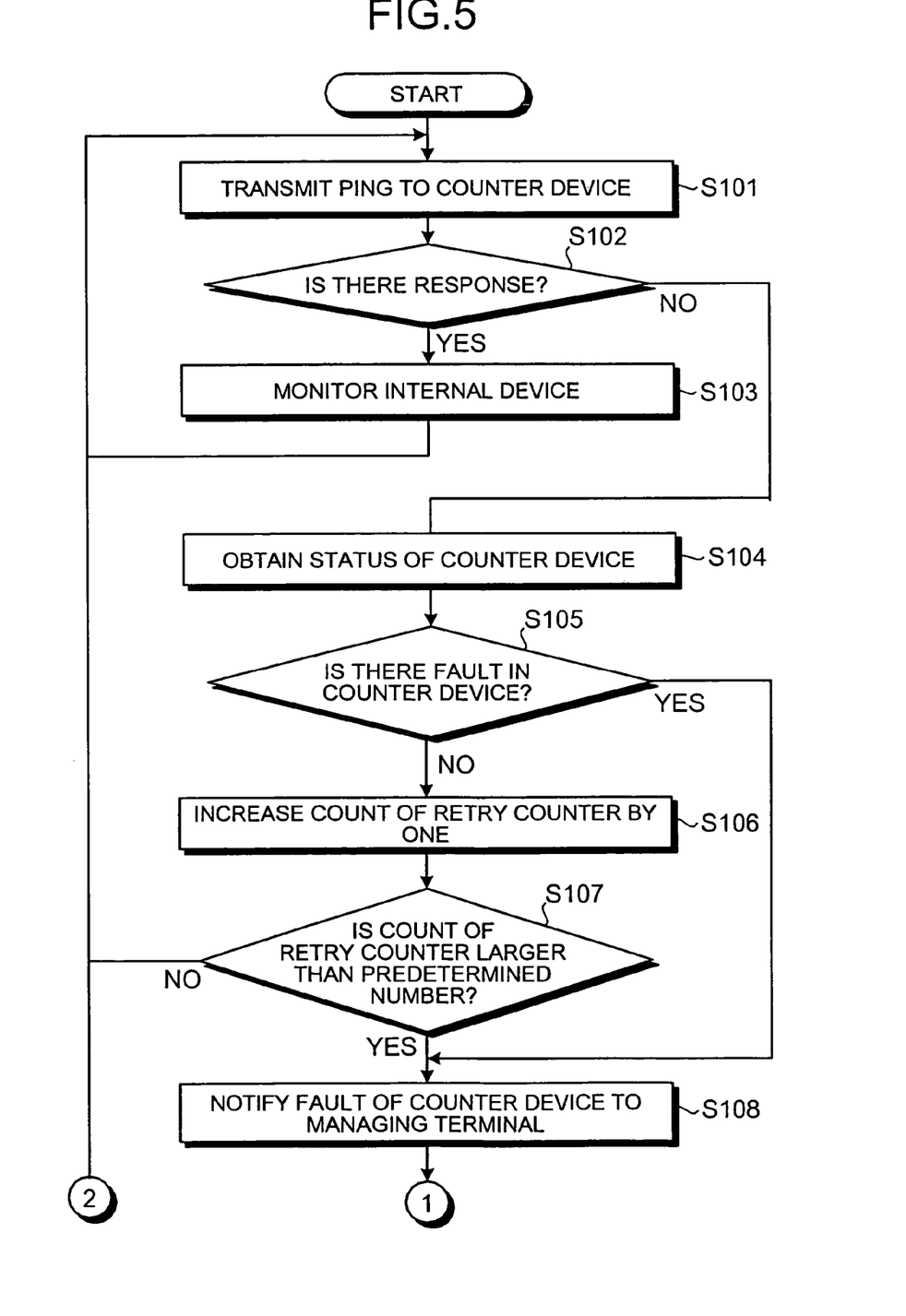
FIG. 5 is a flowchart of a processing procedure for the system managing apparatus shown in FIG. 2.
Figure 6:
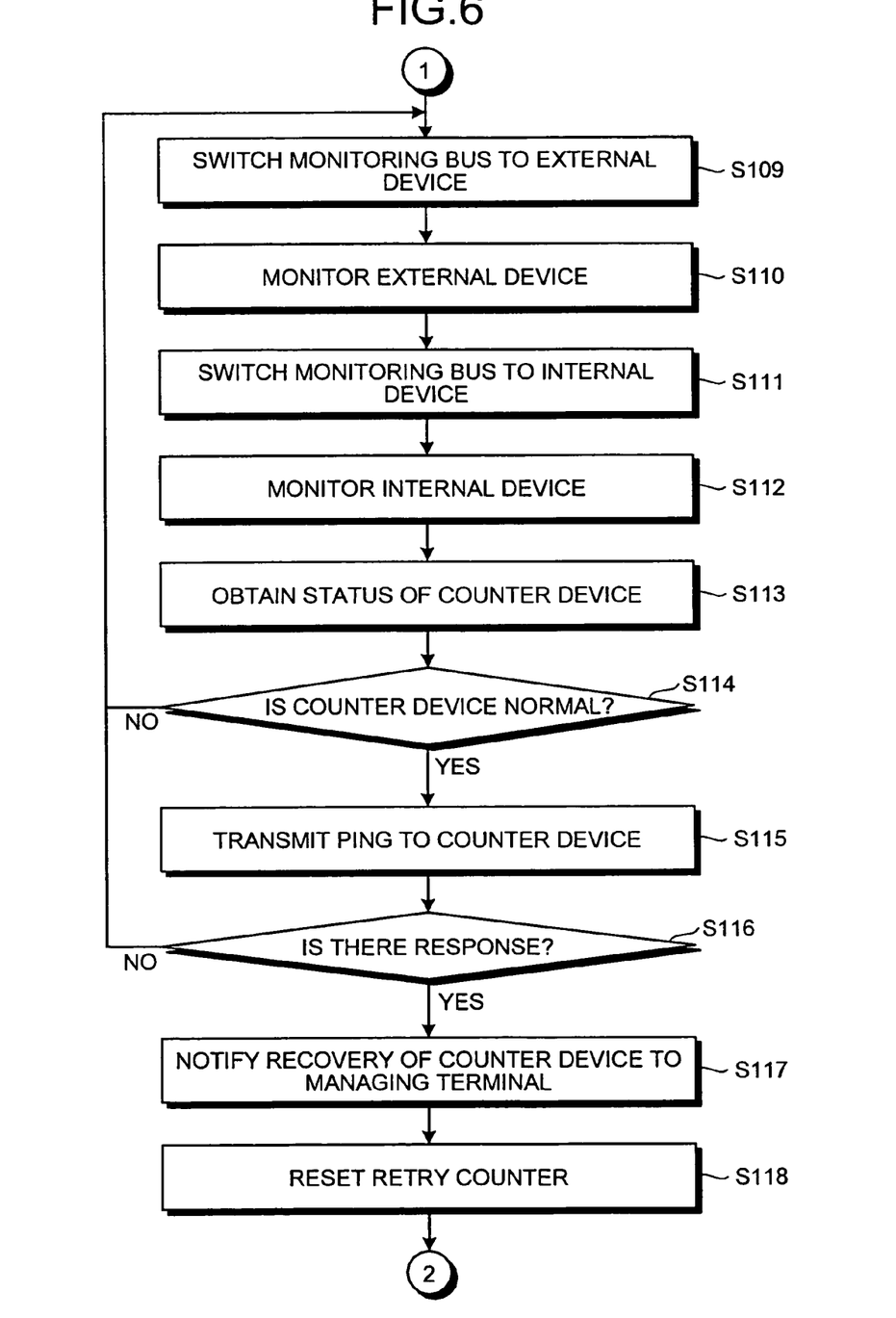
FIG. 6 is a flowchart of a processing procedure for the system managing apparatus shown in FIG. 2.

FIGS. 5 and 6 are flowcharts of the processing procedure for the system managing apparatus (MMB) 1100 shown in FIG. 2. These flowcharts show only the processing concerning the device monitoring out of processing carried out by the system managing apparatus 1100.

As shown in FIG. 5, the system managing apparatus 1100 transmits a PING to a system managing apparatus interconnected to the system managing apparatus 1100, and confirms whether this device is operating normally (step S101). When there is a response to the PING (step S102: Yes), the system managing apparatus 1100 confirms a status of a series of devices belonging to the information processing apparatus in which the device 1100 is installed (step S103). Then, the process returns to step S101, and the system managing apparatus 1100 continues the processing.

When there is no response to the PING (step S102: No), the system managing apparatus 1100 obtains a status of the counter system managing apparatus via the interconnected cable 3000 (step S104). When information of an occurrence of a fault in the counter system managing apparatus is not obtained (step S105: No), the system managing apparatus 1100 increases a retry counter by one (step S106). When the value of the retry counter is less than or equal to a predetermined value (step S107: No), the process returns to step S101, and the system managing apparatus 1100 continues the processing.

When information of an occurrence of a fault in the counter system managing apparatus is obtained via the cable 3000 (step S105: Yes), or when the value of the retry counter is larger than a predetermined value (step S107: Yes), the system managing apparatus 1100 notifies to the managing terminal 300 of the occurrence of the fault in the counter system managing apparatus (step S108). The counter system managing apparatus is regarded to be in trouble when the value of the retry counter is larger than a predetermined value, because there is a case of no response due to a maintenance work or the like.

The system managing apparatus 1100 changes the setting of the monitoring bus switching unit 1160 to set the monitoring bus to a status of being connected to the external device via the cable 3000 (step S109), thereby confirming the status of the external device (step S110). Upon completing the monitoring of the external device, the system managing apparatus 1100 returns the setting of the monitoring bus switching unit 1160 to the original status (step S111), and confirms a status of a series of devices belonging to the information processing apparatus in which the system managing apparatus 1100 is set (step S112).

When the confirmation of the statuses of the external and internal devices is completed, the system managing apparatus 1100 obtains a status of the counter system managing apparatus via the interconnected cable 3000 (step S113). When information that the counter system managing apparatus is normal is not obtained (step S114: No), the process returns to step S109, and the system managing apparatus 1100 confirms the statuses of the external and internal devices.

When information that the counter system managing apparatus is normal is obtained (step S114: Yes), the system managing apparatus 1100 transmits a PING to the counter system managing apparatus, and confirms whether the counter system managing apparatus is normally operating (step S115). When there is no response to the PING (step S116: No), the process returns to step S109, and the system managing apparatus 1100 confirms the statuses of the external and internal devices.

When there is a response to the PING (step S116: Yes), the system managing apparatus 1100 notifies to the managing terminal 300 that the counter system managing apparatus returns to the normal status (step S117). The system managing apparatus 1100 resets the retry counter (step S118). The process returns to step S101, and the system managing apparatus 1100 continues the processing.

According to the present invention, the function of monitoring the device of the system managing apparatus can be made redundant at low cost, without mounting plural system managing apparatuses on each information processing apparatus.

Furthermore, according to the present invention, the system managing apparatus can be made redundant with a simple mechanism.

Moreover, according to the present invention, the power supply control function of the system managing apparatus can be made redundant.

Furthermore, according to the present invention, the fan control function of the system managing apparatus can be made redundant.

Moreover, according to the present invention, it is possible to obtain the information processing apparatus that can make a system managing apparatus redundant at low cost, without mounting plural system managing apparatuses in the information processing apparatus.

Furthermore, according to the present invention, it is possible to obtain a method of implementing redundant system-managing-apparatus that can make the function of the system managing apparatus redundant at low cost, without mounting plural system managing apparatuses in each information processing apparatus.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A system managing apparatus for monitoring a status of a device, the system managing apparatus being installed in an information processing apparatus, the system managing apparatus comprising:
    a connecting unit that connects the system managing apparatus with an other system managing apparatus installed in an other information processing apparatus to exchange information;
    a determining unit that determines whether the other system managing apparatus is in an active status or in a halt status via a connection established by the connecting unit;
    a monitoring-target switching unit that alternately switches, when the determining unit has determined that the other system managing apparatus is in the halt status, a device to be monitored from a device connected to the system managing apparatus to a device connected to the other system managing apparatus and switches back from the device connected to the other system managing apparatus to the device connected to the system managing apparatus;
    a monitoring unit that alternately monitors the device connected to the system managing apparatus and the device connected to the other system managing apparatus by controlling the monitoring-target switching unit until the determining unit determines that a status of the other system managing apparatus is back to the active status; and
    a notifying unit that notifies that the other system managing apparatus has returned to a normal status when the determining unit determines that the other system managing apparatus is back to the active status.

2. The system managing apparatus according to claim 1, further comprising a power-supply control unit that controls either a power supply device connected to the system managing apparatus or other power supply device connected to the other system managing apparatus based on a status of the monitoring-target switching unit.

3. The system managing apparatus according to claim 1, further comprising a fan control unit that controls either a fan connected to the system managing apparatus or other fan connected to the other system managing apparatus based on a status of the monitoring-target switching unit.

4. An information processing apparatus comprising a system managing apparatus for monitoring a status of a device, wherein the system managing apparatus includes:

a connecting unit that connects the system managing apparatus with an other system managing apparatus installed in an other information processing apparatus to exchange information;

a determining unit that determines whether the other system managing apparatus is in an active status or in a halt status via a connection established by the connecting unit;

a monitoring-target switching unit that alternately switches, when the determining unit has determined that the other system managing apparatus is in the halt status, a device to be monitored from a device connected to the system managing apparatus to a device connected to the other system managing apparatus and switches back from the device connected to the other system managing apparatus to the device connected to the system managing apparatus;

a monitoring unit that alternatively monitors the device connected to the system managing apparatus and the device connected to the other system managing apparatus by controlling the monitoring-target switching unit until the determining unit determines that a status of the other system managing apparatus is back to the active status; and a notifying unit that notifies that the other system managing apparatus has returned to a normal status when the determining unit determines that the other system managing apparatus is back to the active status.

5. A method of implementing a redundant system-managing-apparatus for monitoring a status of a device, the method comprising:

connecting a first system managing apparatus of a first information processing apparatus with a second system managing apparatus of a second information processing apparatus for an exchange of information;

first determining including
  the first system managing apparatus determining whether the second system managing apparatus is in an active status; and
  the second system managing apparatus determining whether the first system managing apparatus is in an active status;

switching, when it is determined that one of the first system managing apparatus and the second system managing apparatus is in a halt status, including
  the first system managing apparatus switching a device to be monitored from a device connected to the first system managing apparatus to a device connected to the second system managing apparatus when it is determined that the second system managing apparatus is in a halt status, and monitoring a status of the device connected to the second system managing apparatus in the halt status by performing a network communication, and switching the device to be monitored from the device connected to the second system managing apparatus to the device connected to the first system managing apparatus, and monitoring a status of the device connected to the first system managing apparatus in the active status; and
  the second system managing apparatus switching a device to be monitored from the device connected to the second system managing apparatus to the device connected to the first system managing apparatus when it is determined that the first system managing apparatus is in a halt status, and monitoring the status of the device connected to the first system managing apparatus in the halt status by performing a network communication, and switching the device to be monitored from the device connected to the first system managing apparatus to the device connected to the second system managing apparatus, and monitoring the status of the device connected to the second system managing apparatus in the active status;

second determining including
  the first system managing apparatus determining whether the second system managing apparatus is in the active status when it is determined that the second system managing apparatus is in the halt status at the first determining; and
  the second system managing apparatus determining whether the first system managing apparatus is in the active status when it is determined that the first system managing apparatus is in the halt status at the first determining;

repeating including
  the first system managing apparatus repeating the switching and the second determining until it is determined that the second system managing apparatus is back to the active status at the second determining; and
  the second system managing apparatus repeating the switching and the second determining until it is determined that a status of the first system managing apparatus is back to the active status at the second determining; and notifying including
  the first system managing apparatus notifying that the second system managing apparatus has returned to a normal status when it is determined that the second system managing apparatus is back to the active status at the second determining; and
  the second system managing apparatus notifying that the first system managing apparatus has returned to a normal status when it is determined that the first system managing apparatus is back to the active status at the second determining.

* * * * *